United States Patent [19]
Craft et al.

[11] Patent Number: 5,875,454
[45] Date of Patent: Feb. 23, 1999

[54] COMPRESSED DATA CACHE STORAGE SYSTEM

[75] Inventors: David John Craft, Austin, Tex.; Richard Greenberg, Rochester, Minn.

[73] Assignee: International Business Machiness Corporation, Armonk, N.Y.

[21] Appl. No.: 685,761

[22] Filed: Jul. 24, 1996

[51] Int. Cl.6 .................................................. G06F 12/08
[52] U.S. Cl. ......................................... 711/113; 711/126
[58] Field of Search .................................... 711/126, 113

[56] References Cited

U.S. PATENT DOCUMENTS

| | | | |
|---|---|---|---|
| 4,490,782 | 12/1984 | Dixon et al. | 711/136 |
| 5,133,060 | 7/1992 | Weber et al. | 711/113 |
| 5,185,719 | 2/1993 | Dhong et al. | 365/189.01 |
| 5,263,136 | 11/1993 | DeAguiar et al. | 345/511 |
| 5,345,577 | 9/1994 | Chan et al. | 711/106 |
| 5,369,605 | 11/1994 | Parks | 364/715.09 |
| 5,440,336 | 8/1995 | Buhro et al. | 348/13 |
| 5,444,489 | 8/1995 | Truong et al. | 348/422 |
| 5,448,742 | 9/1995 | Bhattacharya | 711/154 |
| 5,450,130 | 9/1995 | Foley | 348/391 |
| 5,463,422 | 10/1995 | Simpson et al. | 348/390 |
| 5,617,552 | 4/1997 | Garber et al. | 711/1 |
| 5,627,534 | 5/1997 | Craft | 341/87 |
| 5,652,857 | 7/1997 | Shimoi et al. | 711/113 |

OTHER PUBLICATIONS

Microsoft Press, "Microsoft Press Computer Dictionary: The Comprehensive Standard for Business, School, Library, and Home", 2nd edition, ISBN 1–55615–597–2, p. 70, 1994.

IBM Technical Disclosure Bulletin, vol. 27, No. 4B, Sep. 1984, Validity Verification of Compressed Data Using Disk Cache Facilities, pp. 2487–2489.

IBM Technical Disclosure Bulletin, vol. 37, No. 02B, Feb. 1994, Conditional Least–Recently–Used Data Cache Design to Support Multimedia Applications, pp. 387–389.

IBM Technical Disclosure Bulletin, vol. 37, No. 02B, Feb. 1994, "Hybrid Reducdancy Direct–Access Storage Device Array with Design Options", pp. 141–148.

*Primary Examiner*—Tod R. Swann
*Assistant Examiner*—Felix B. Lee
*Attorney, Agent, or Firm*—Casimer K. Salys

[57] ABSTRACT

A system and related architecture for providing random access cache storage between a processor accessing data at high speed and in small block units and a mass storage medium holding data in large transfer units. Lossless data compression is applied to large transfer units of data before storage in a DRAM. Cache address space is assigned in allocation units which are assigned without a prespecified pattern within the DRAM but linked through chains. The chain lengths are adjusted to match the compressibility characteristics of transfer units and include resources for scavenging residuals. Logical blocks materially smaller than the transfer units are accessed and decompressed during readout from the DRAM. The system architecture provides resources for accessing the individual logical blocks through an index. The invention is particularly suited for a disk drive cache system having a small cache DRAM in conjunction with a magnetic or optical disk mass storage system reading highly compressible data.

20 Claims, 8 Drawing Sheets

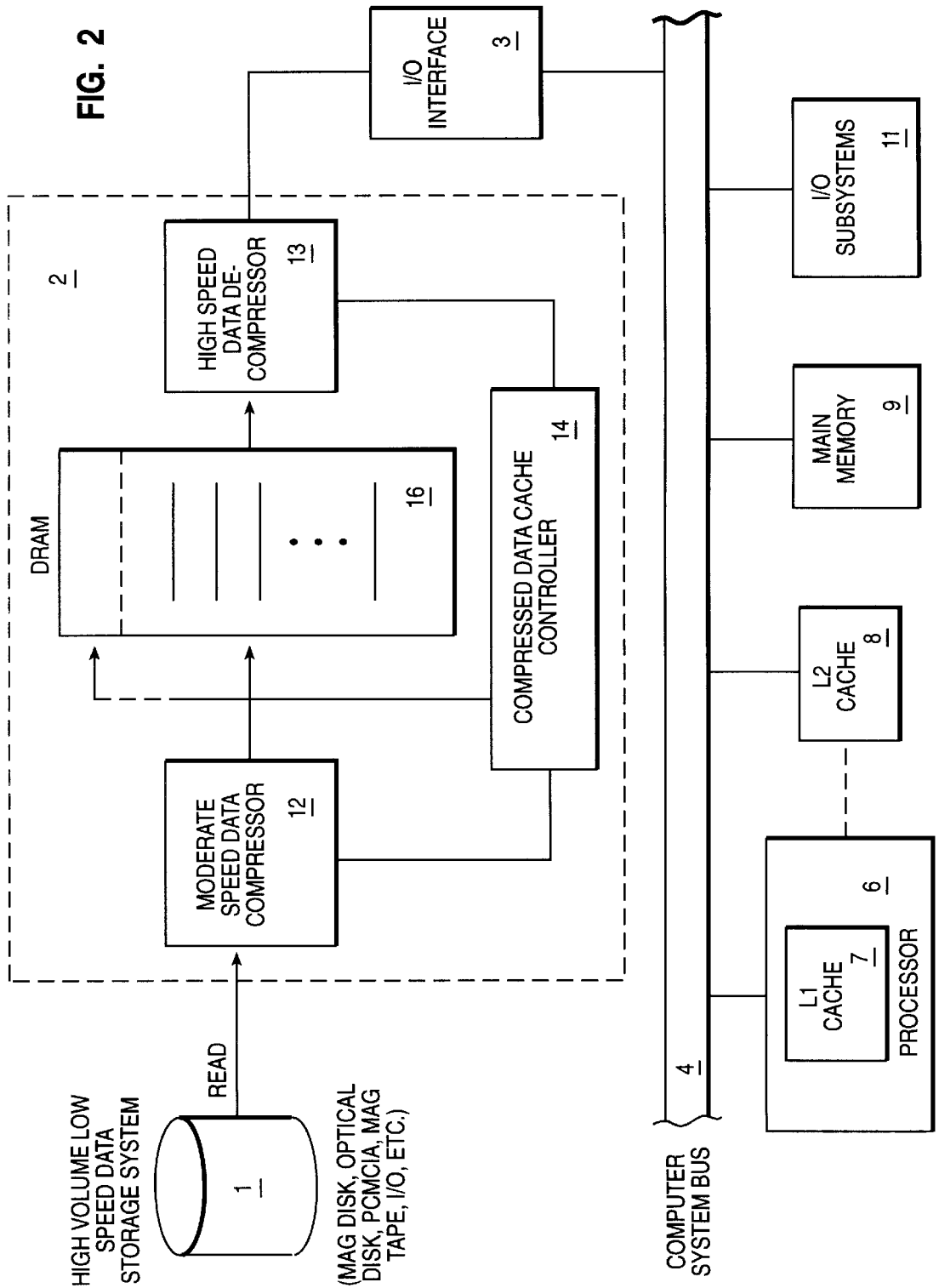

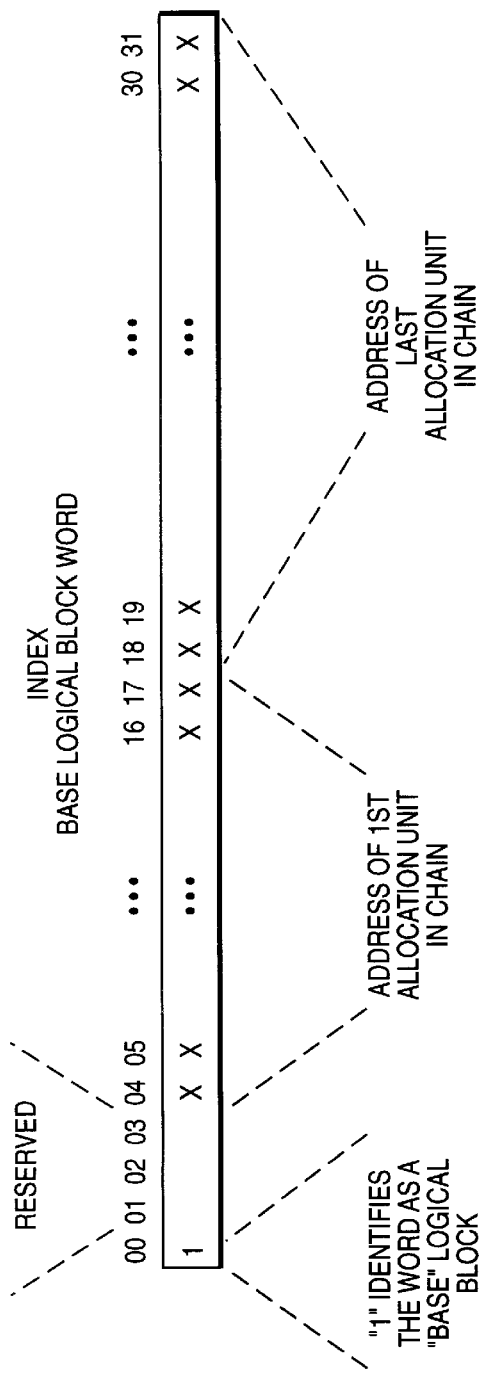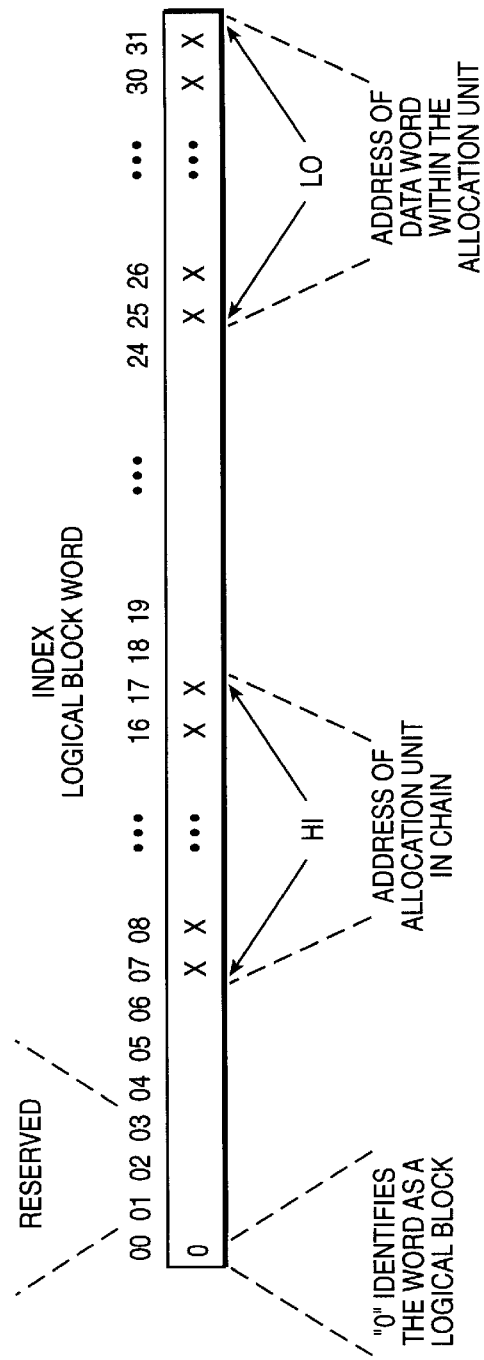

COMPRESSED DATA CACHE STORAGE SYSTEM

CROSS-REFERENCE TO RELATED APPLICATIONS

The present invention is related to co-pending U.S. applications having Ser. No. 08/355,865 filed Dec. 14, 1994; Ser. No. 08/409,766 filed Mar. 23, 1995; Ser. No. 08/536,901 filed Sep. 29, 1995; Ser. No. 08/516,773 filed Aug. 18, 1995; Ser. No. 08/228,321 filed Apr. 15, 1994; Ser. No. 08/320,088 filed Oct. 7, 1994; Ser. No. 08/173,738 filed Dec. 23, 1993; and Ser. No. 08/290,451 filed Aug. 15, 1994. All the above-identified patent applications are assigned to the assignee of the present invention.

FIELD OF THE INVENTION

The present invention relates generally to data caches in computer systems or the like. More particularly, the invention is directed to the compressed storage of data in a cache situated between a low speed, high volume, data storage system and a high speed data processing system.

BACKGROUND OF THE INVENTION

High volume, nonvolatile data storage devices such as magnetic or optical disks, tapes, PCMCIA cards, or the like, are commonly used with computer systems to store large quantities of read accessed data. Studies of computer systems accessing data from such mass storage media have established that data caching can materially improve the computer system performance, especially where the bulk of the data being processed is read in large units from the storage media, such as is common with CD video processing. Furthermore, studies have established that the larger the cache size the better the performance improvement. Such system level performance effects are somewhat expected given that the data storage media operate at average data transfer rates anywhere from 1 to 3 orders of magnitude slower than the capabilities of the processors.

An ideal mass storage media cache is adequate in size to receive and store multiple, relatively large, units of data, each unit being composed of tens of thousand of bytes. Though the transfer of data from the mass storage media to such a cache is accomplished in large units, it occurs at a relatively slow average data read rate. In contrast, the reading of data from the cache is conventionally performed using smaller units, but at faster data transfer rates. Given that a relatively large cache is needed to materially improve computer system performance, and the cost of DRAM cache is often a significant part of the storage media cost, cache size is often compromised to provide a lower mass storage media component cost. A particular example is the highly competitive magnetic hard disk drive marketplace, where there is constant contention between reducing the mass storage media component cost and improving its data transfer rate performance.

Though data compression techniques have been utilized to reduce memory size in various data processing applications, lossless data compression has not been applied to mass storage media cache systems. In part, this is attributable to the compressibility variations experienced with lossless data compression, as affected by the data content. Because the compressibility of data units vary unpredictably, cache storage allocation and deallocation control, as well as the high data compression and decompression speeds required, have proven to be major obstacles. Therefore, though the concept of compressing data for storage in a cache is a recognized desirable design objective, the realization of the result in an efficient and fast system has heretofore been lacking.

Accordingly, there is a need for a system and method by which data retrieved from a mass storage media can be compressed, stored in a fast and efficiently managed cache, randomly accessed from the cache, and timely decompressed for transmission to the data processing system.

SUMMARY OF THE INVENTION

The present invention relates to a data cache interface situated between a data storage system and a data processing system, comprising means for compressing a block of data received from the data storage system into a related compressed data unit, cache memory means for storing multiple compressed data units in addressable allocation units, means for linking multiple allocation units into a chain related to a transfer unit of multiple blocks, index means for converting a data processing system address to a specific block of data into a cache memory means address identifying a specific compressed data unit within a specific allocation unit and chain, and means for decompressing the specific compressed data unit responsive to the receipt of the data processing system address.

In another form, the present invention relates to a method of operating a data cache interface situated between a data storage system and a data processing system, comprising compressing a block of data received from the data storage into a related compressed data unit, storing multiple compressed data units in addressable allocation units of a cache memory so that multiple allocation units relating to a transfer unit of multiple blocks are linked in a chain, generating an index to convert a data processing system address to a specific block of data into a cache memory address which identifies a specific compressed data unit within a specific allocation unit and chain; and decompressing the specific compressed data unit into the specific block of data responsive to the receipt of the data processing system address.

A particularized practice of the invention defines an architecture for a cache system, the cache system being situated between a source providing data in relatively large transfer units and a processor randomly accessing the data in relatively smaller logical blocks. The cache architecture stores the data in compressed form to maximize the volume of data quickly accessible by the processor. The data is compressed upon receipt from the mass storage media, stored in a DRAM cache, and decompressed upon random access by the processor.

The compressed data cache storage system defined by the present invention manages the allocation and deallocation of DRAM address space in relation to the compressibility of the data, including the formation of linked data chains related in size to large transfer units received from the mass storage media. An index is created and used to translate random access addresses from the processor to words stored within allocation units of the DRAM in block size subdivisions suitable for fast decompression. The invention provides a cache architecture which reduces DRAM cost and allows quick access to large volumes of data from the mass storage media. The system is particularly valuable and efficient when the data itself is characterized by high levels of compressibility, such as multimedia data or database entries.

These and other features of the invention will be more clearly understood and appreciated upon considering the description of the detailed embodiment as set forth hereinafter.

BRIEF DESCRIPTION OF THE DRAWINGS

FIG. 2 is a schematic block diagram of a computer system in the context of which the present invention is preferably utilized.

FIGS. 8 and 9 schematically illustrate the allocation of bits within words in the index.

DESCRIPTION OF THE PREFERRED EMBODIMENT

The present invention is directed to a cache architecture where the data subject to cache storing is received in uncompressed form in relatively large transfer units, the data is compressed, the data is stored in compressed form to maximize the cache storage, typically Dynamic Random Access Memory (DRAM), the stored compressed data is subject to random access read from the cache in compressed form, and the data is decompressed in individual logical blocks. The cache is particularly suited for interfacing a disk drive and a processor, where the disk drive stores large volumes of highly compressible data which is subject to high speed random access and processing.

Figure 1:
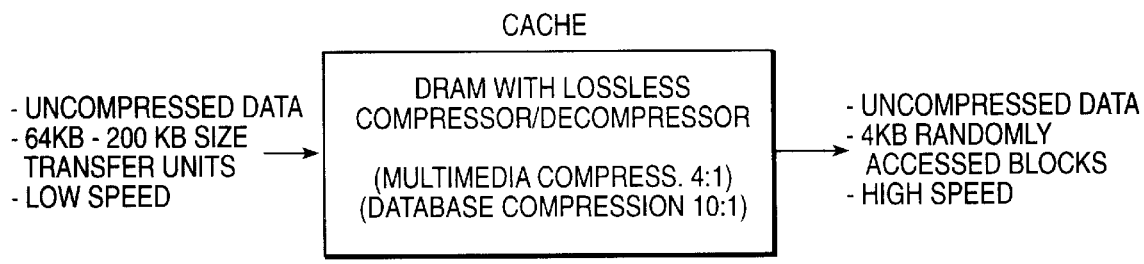
FIG. 1 is a schematic block diagram conceptually relating the input and output of the present lossless data compression cache interface.

The cache architecture to which the present invention pertains is conceptually depicted in FIG. 1. As shown in the figure, uncompressed data is read in relatively large size transfer units (e.g. 64K–200K bytes) from a hard disk drive or the like, which if randomly accessed by word would exhibit a relatively low average speed of response. The data so received is compressed and stored in a DRAM through the use of a Lempel-Ziv type lossless data compression algorithm. Thereafter, compressed multimedia data is accessed in units corresponding to 4K byte blocks for decompression and selective transfer to the processor. The key feature is the ability to efficiently compress, store, retrieve and decompress data whose compression characteristics vary with the data content.

The preferred embodiment of the present invention will be described in the context of the system in FIG. 2 of the drawings. The terminology used in describing the embodiment is set forth below to provide a framework of reference.

Allocation Unit

The moderate granularity units of DRAM address space into which the cache is partitioned. For the embodying example, an allocation unit within the cache corresponds to the cache size divided by the SRAM size (1 MB/2K=512B). The upper portion of the address of each allocation unit matches the corresponding SRAM address.

Transfer Unit

A large unit of data from the mass storage media. For purposes of the embodiment, a transfer unit is a full track of data from a disk drive. The boundary is derived from a recognition that the track seek time of the disk is much greater than the data transfer time once the head of the disk is aligned to the track. For a typical disk drive, the size of the transfer unit is 64K–200K bytes. An average of 128K bytes will be used. The data of a transfer unit is compressed and then distributed noncontiguously through the allocation units which make up the DRAM address space, in keeping with a linking pattern defined by a data chain stored in an SRAM.

Data Chain

A succession of allocation units linked to provide storage space adequate to hold the compressed data of a transfer unit. The end of a data chain is identified by a zero address in the SRAM.

SRAM

A Static Random Access Memory used to store the link pattern for the data chain, each chain corresponding to a transfer unit. The data stored in each SRAM address represents the next address in the chain, and each such address is also the higher bits of the DRAM starting address for the corresponding allocation unit. Each chain of SRAM addresses defines a corresponding set of allocation units in the DRAM, related directly by address. The zero location in the SRAM stores the first address of the free chain.

Free Chain

Represents the unused allocation unit address space in the DRAM linked into a chain usable during the reading of a transfer unit from the disk drive into the cache. The presence of a zero value at the zero address of the SRAM indicates that the DRAM is full and, therefore, no free chain exists. Data values other than zero in the zero address of the SRAM identify the starting address of the free chain, which is itself linked in the manner of a data chain.

Logical Block

Data corresponding to 4K bytes in non-compressed form. Each 4K byte block is individually compressed using an adaptive Lempel-Ziv compression algorithm. Each compressed 4K byte block is individually addressable within the DRAM. The 4K byte block boundaries are identified during compression and stored in an index to allow the selective decompression by block. The 4 KB block size is based upon a balance between a sufficiently large unit of data to allow efficient compression and a sufficiently small unit of data to permit fast decompression. Furthermore, the 4K block size for a logical block is typical of the minimum sized units of data managed by modern operating systems.

Index

The first address space of the DRAM, used to identify the starting points for successive 4K byte blocks of data in compressed form. The data in the index region of the DRAM identifies a 4K byte block by its starting address in the DRAM, the high order bits corresponding to the allocation unit address and the lower order bits identifying the DRAM line or word at which the 4K byte block starts.

Index Groups

Groups of contiguous lines from within the index in the DRAM which correspond to a single transfer unit and are, therefore, associated by a data chain. The maximum number of index lines within an index group is derived by determining the maximum number of blocks in the largest transfer unit.

Base Logical Block

The first index line within each index group specifying the first and last address of the corresponding data chain. The number of base logical blocks matches the maximum number of transfer units storable in the DRAM, as defined by the design.

LFU

A conventional process as applied to data sets stored in a cache to determine the Least Frequently Used data. The LFU process determines which data should be replaced when the DRAM becomes full in the course of loading a transfer unit.

FIG. 2 schematically depicts the preferred context within the present invention is to be practiced. In that context, high volume data storage device 1, (magnetic disk, optical disk, PCMCIA, magnetic tape, Input/Output, etc.) is accessed to read data in transfer units. The data is received and compressively stored in system 2 for subsequent random access read through Input/Output interface 3. In keeping with the conventional architecture of the processing system, I/O interface 3 shares computer system bus 4 with processor 6, L2 cache 8, main memory 9 and other I/O subsystems 11. Processor 6 is shown to include its own L1 level cache 7.

The focus of the present invention is on the cache architecture within the system defined by block 2, as preferably applied to a read of the data from high volume storage system 1. Compressed data cache controller 14, as integrated with DRAM 16, increases the volume of randomly accessible data quickly available to processor 6 while minimally affecting the size of DRAM 16 using moderate speed lossless data compressor 12 and high speed data decompressor 13.

Moderate speed data compressor 12 and high speed decompressor 13 preferably employ the Lempel-Ziv algorithm. Implementations of that algorithm are described in copending U.S. patent applications Ser. No. 08/409,766 (filed Mar. 23, 1995) and Ser. No. 08/516,773 (filed Aug. 18, 1995), the subject matter of which are incorporated by reference herein. The concepts are based upon the publication entitled "A Universal Algorithm for Sequential Data Compression", by authors Ziv and Lempel, as appeared in the IEEE Transactions on Information Theory, Vol. IT-23, No. 3, pp. 337–343, in 1977.

Figure 3:
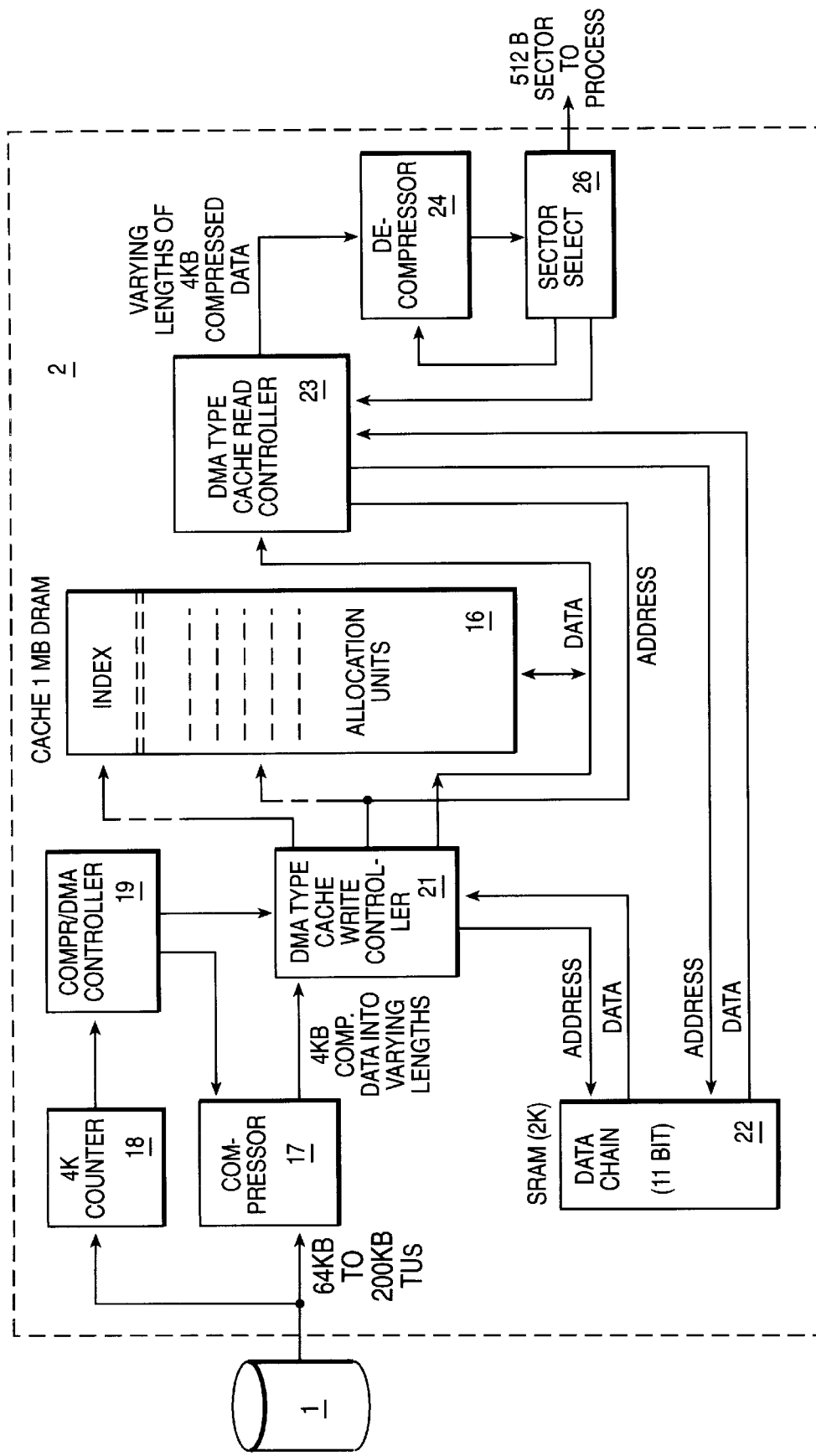
FIG. 3 is a schematic block diagram depicting the functional elements in an embodiment of the lossless data compression cache interface characterizing the present invention.

The key elements in the architecture of the present compressed data cache storage system are depicted in FIG. 3. Data is received in transfer units of the 64K to 200K bytes. Individual 4K byte size logical blocks are compressed in adaptive Lempel-Ziv data compressor 17, the increment size being controlled through the interaction of 4K counter 18 and compressor/DMA controller 19. The logical blocks compressed are stored as compressed data in DRAM 16 using a data chain of multiple 512 byte allocation units until the complete transfer unit is compressed and stored. Controller 21 distinguishes between successive 4K byte logical blocks, begins each 4K byte logical block on a new line in DRAM 16, and generates an index of the new starting lines in the index section of DRAM 16. Controller 21 also specifies and records the pattern of allocation units in DRAM 16 used to store a single transfer unit, through a data chain structure stored in SRAM 22.

Controller 23 is used to read data from cache DRAM 16. The index portion of DRAM 16 is accessed with the processor specified address, using conventional translation techniques to specify a 512 byte sector of data, following which controller 23 initiates a read of the compressed data representing a 4K byte logical unit encompassing the sector address. The selected logical unit of compressed data is processed by adaptive Lempel-Ziv data decompressor 24 until such time as the desired 512 byte size sector from within the 4K byte logical block is reached. Thereupon, selector 26 transmits the 512 byte sector to the processor as a decompressed cache output. Then selector 26 flushes decompressor 24 and terminates any remaining read of the 4K byte logical block by the controller 23.

The algorithm used in decompressor 24 must obviously be the complement of that practiced in compressor 17. As noted earlier both compressor 17 and decompressor 24 preferably employ the Lempel-Ziv algorithm described in the aforementioned IEEE article. Though particular implementations of the algorithm are described in the earlier noted copending patent applications, the compression efficiency, the data content, the desired compression speed, the desired decompression speed, the block size, and related factors may dictate the use of other data compression and decompression algorithms.

Figure 4:
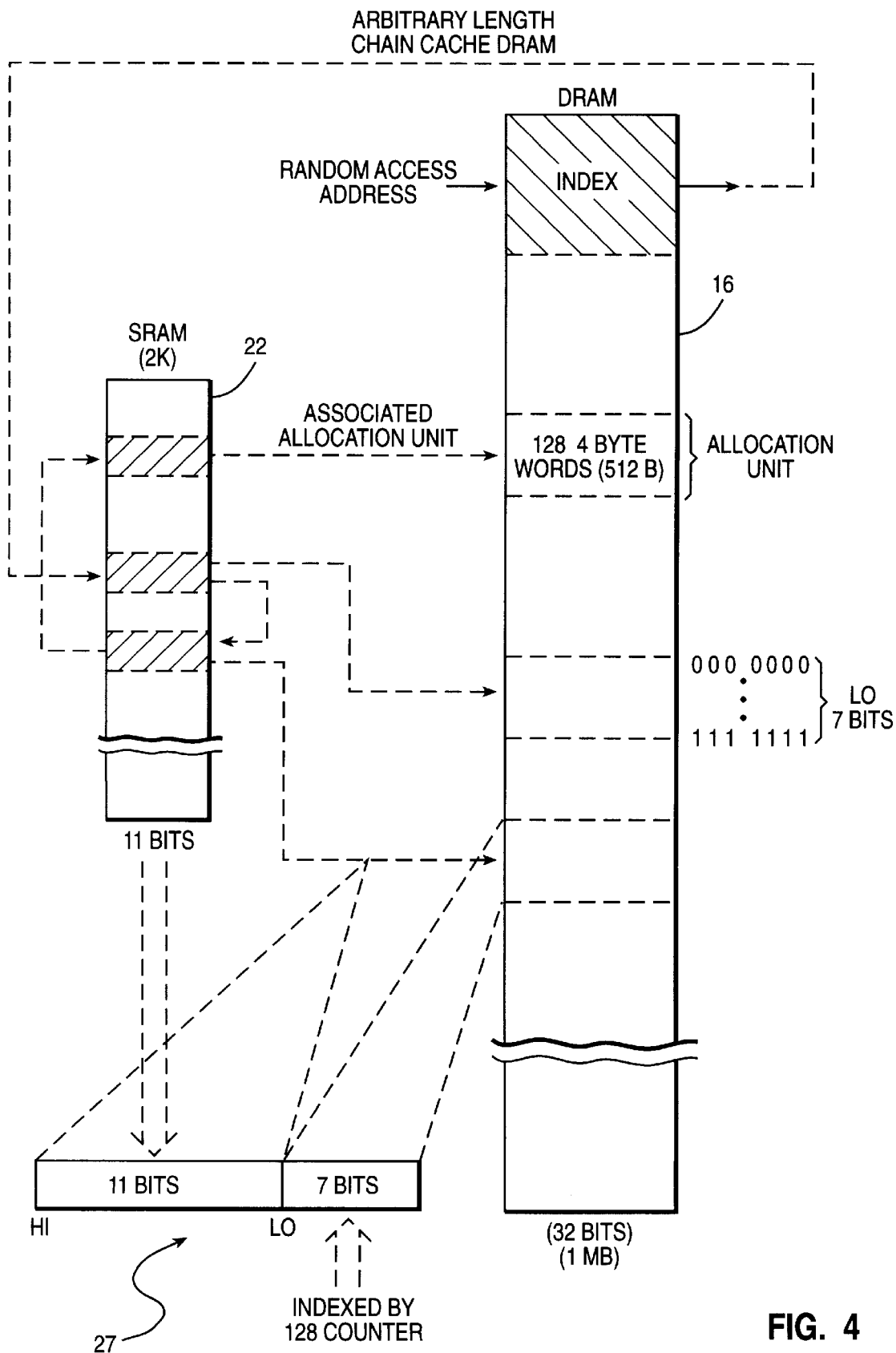
FIG. 4 schematically depicts the linking of storage locations in a cache DRAM to efficiently store data of diverse unit sizes.

FIG. 4 schematically illustrates the operations associated with the dynamic allocation of address space within DRAM 16 during the loading a transfer unit of data. Controller 21 (FIG. 3) manages the interaction between SRAM 22 and DRAM 16. Controller 21 allocates physical address space in the non-index portions of DRAM 16 by generating and storing addresses in SRAM 22. Each SRAM word corresponds to an allocation unit of DRAM address space. The SRAM word address is in effect also the high order part of the DRAM word address and, as such, determines the DRAM allocation unit, while the low order portion of the DRAM address identifies individual words within each allocation unit.

The SRAM data storage locations are connected into chains, including both data and free types, by using the SRAM words as pointers to the next SRAM address in the chain. Thereby, successions of SRAM addresses are linked into chains which correspondingly link a succession of DRAM allocation units into data storage chains capable of storing the data for large transfer units.

The number of words in the SRAM also determines its width in bits, if one SRAM word must be able to address any other. Thus, in the design of FIG. 4, each of the 2,048 SRAM words is 11 bits wide. DRAM 16 as embodied in FIG. 4 is 32 bits wide. In that context, each allocation unit in the DRAM is composed of 128 four (4) byte long words, to form the selected 512 byte allocation unit size. With 128 word size allocation units, 7 lower order bits are needed to select among the individual words from within each allocation unit. Thereby, as shown in FIG. 4, word address 27 used for DRAM 16 is composed of 11 high order bits and 7 low order bits, the 11 high order bits matching the SRAM 22 addresses.

FIG. 4 shows that a random access address from processor 6 (FIG. 2) is translated through the index of DRAM 16 to identify the beginning of a data chain. The linking of the chain is defined in SRAM 22, with the corresponding linking of data storage locations within DRAM 16. Thereby, large transfer units of variable compressibility data are stored in a cohesive data chain.

Figure 5:
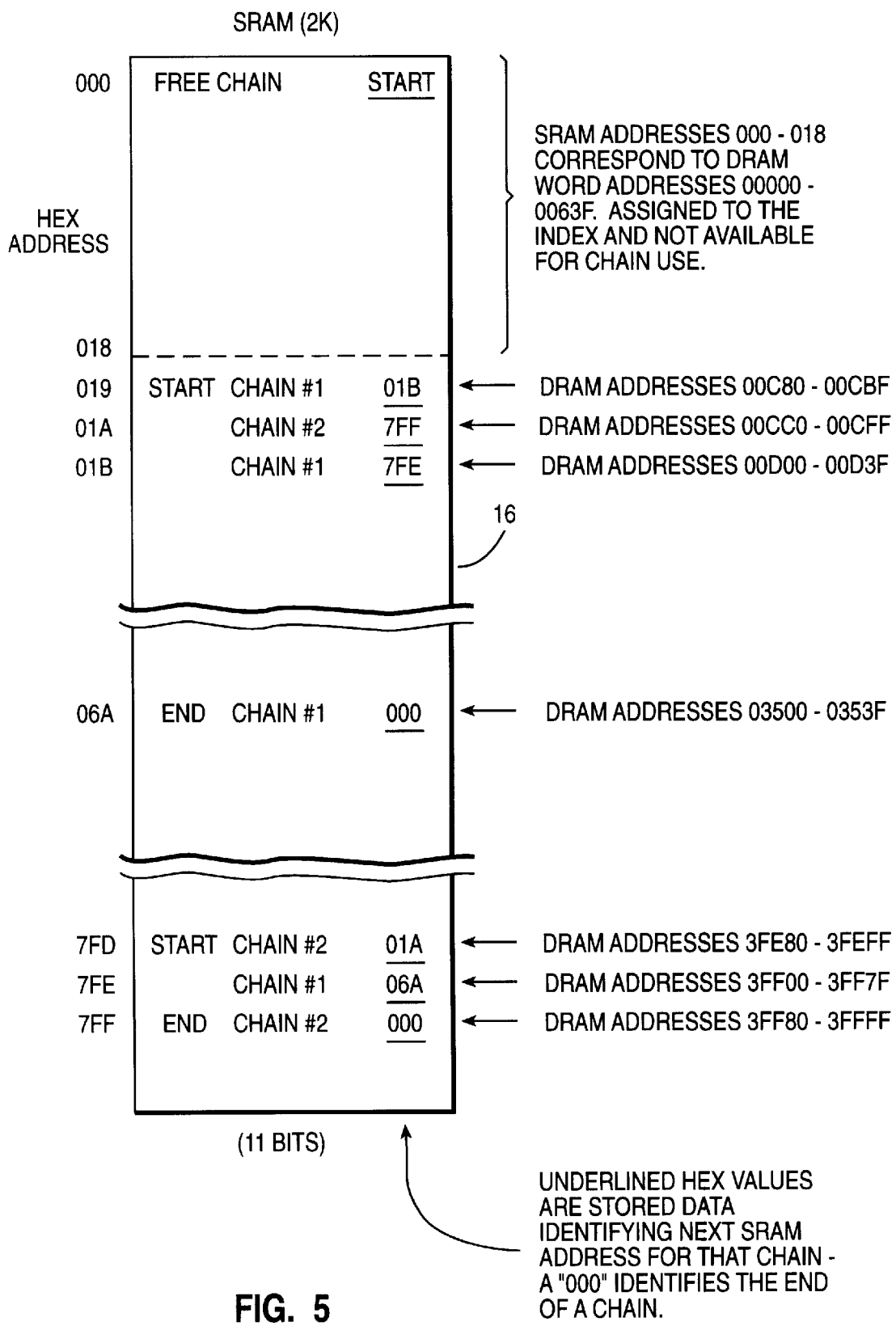
FIG. 5 schematically illustrates the relationship between a linked chain and the addresses in the cache DRAM.

Specific examples of data chains stored in SRAM 22, including corresponding DRAM addresses, appear in FIG. 5. The first data chain consists of four allocation units, beginning at the DRAM address 00C80–00CBF, continuing next to DRAM addresses 00D00–00D3F, then continuing with DRAM addresses 3FF00–3FF7F, and concluding with DRAM addresses 03500–0353F. The second data chain begins with DRAM address 3FE80–3FEFF and concludes at the third allocation unit with the address 3FF80–3FFFF.

Note that SRAM addresses 000–018 are not used to allocate DRAM for data storage. This is because the address range corresponds to an area of DRAM reserved for the index structure, to be described later. Because at least two allocation units of the DRAM are always used for the index structure, the SRAM addresses 000 and 001 can never be part of any normal data chain.

SRAM addresses 000 and 001 are used for pointers to the first and last allocation units in the free chain. The free chain is exactly like a data chain except that its first allocation unit address is held in SRAM location 000 and its last address in SRAM location 001.

Since allocation unit number 000 is never used in a data chain, the value 000 in an SRAM location is used as a chain terminator and as such indicates that there are no more allocation units in the chain. Note in the example of FIG. 5 that the ends of chains 1 and 2 both hold the value 000.

The retrieval of data from DRAM 16 in the context of a storage involving multiple chained allocation units begins with the identification of a starting allocation unit through the index as shown in FIG. 4. DMA type controller 23 (FIG. 3) readily parses the data chain within the DRAM structure to retrieve data in the sequence defined by the chain. Each fetch of a DRAM data word is followed by an incrementing of the low order addresses in progression through the DRAM words in each allocation unit. Upon reaching the end of an allocation unit, the SRAM is accessed to determine the next allocation unit, identified by the high order portion of the address as derived from the SRAM. Thereupon, the DMA type operations continue through the succeeding allocation unit in the DRAM. Though data retrieval in this manner involves a SRAM access every 128 words, not only is this a relatively negligible loss in the read cycle, but it can be eliminated through a prefetch from the SRAM.

Data read from disk 1 (FIG. 3) and stored into compressed data cache storage system 2 is managed in large data size transfer units. The entry of data into DRAM 16 involves the over-writing of existing data in one or more chains with a new transfer unit of compressed data. The linking of the chain using the SRAM is analogous to that described in the retrieval of data from DRAM 16. However, since the compressibility of the data varies with the data content, the new transfer unit is very unlikely to exactly fit the replaced data chain. Therefore, either more allocation units will need to be furnished during the operation of the data storage, or some allocation units may be left over after the new transfer unit is completely stored.

The normal sequence of loading a compressed transfer unit data begins with an over-writing of a specified data chain. Once the specified data chain is fully consumed, the writing of data into allocation units follows the order established in the free chain, if such exists, until it too is consumed. The order of the free chain is linked to the specified data chain so that all the allocation units follow a continuum through the DRAM. In the event the storage specified in the free chain is still inadequate for the compressed transfer unit, then, the first specified overflow data chain is brought into use. If the first specified overflow data chain is still inadequate, then successive further overflow data chains are specified and utilized.

Before the storage of a transfer unit, controller 21 specifies the data chain to be over-written and an overflow data chain to be used in the event the specified data chain and any available free chain are inadequate for the size of the compressed transfer unit. Preferably, the process for specifying the two employs the application of a standard least frequently used (LFU) algorithm. Similarly, in the event the loading process results in the use of the overflow data chain to store a transfer unit, controller 21 initiates the selection of the next successive data chain to be over-written.

Preferably, controller 21 establishes a minimum size for any designated overflow data chain by considering the minimum transfer unit size and maximum estimated compressibility, with the objective of providing adequate time for controller 21 to select the next overflow data chain when the writing of data into the previously designated overflow data chain is first detected. Thereby, the data storage operation can continue for as many overflows as necessary without a delay in the selection of the overflow data chains.

Upon the completion of the storage of a transfer unit, the free chain, is updated by designating a new starting location in the free chain or by adding unused allocation units to the existing free chain. The details of the process will be described hereinafter.

The efficiency of the allocation procedure as described above is relatively good for applications involving the storage of entire disk drive tracks, ranging from 64K to 200K bytes, as transfer units in the DRAM cache. For average compression ratios ranging between 2:1 and 4:1, the compressed transfer unit extends in size from 16K to 100K bytes, considering the least compression for the largest track and the most compression for the smallest track. Since, on an average, half of an allocation unit within the DRAM is wasted for each transfer unit compressed and stored as a data chain, this loss amounts to a range of 1.026%–1.5% for the longest and shortest transfer units considered, respectively.

A single compression operation as applied to an entire 64K to 200K byte transfer unit would in most cases yield good compression when compared to the performance of materially smaller size transfer units. The problem with that practice arises from the characteristics of the Lempel-Ziv algorithm, wherein decompression must commence from the beginning of each compressed unit of data. Therefore, even though preferred adaptive Lempel-Ziv data decompressor 24 (FIG. 3) is functionally fast, the 16K to 100K byte size of the compressed transfer unit would require a significant amount of time to decompress if the randomly accessed address sought by the processor were near the end of the address range within the transfer unit. For that reason, compression is incrementally applied to small segments of the transfer unit, selected for the present embodiment to be logical blocks of 4K byte size, which are indexed and individually addressable within DRAM 16.

Figure 6:
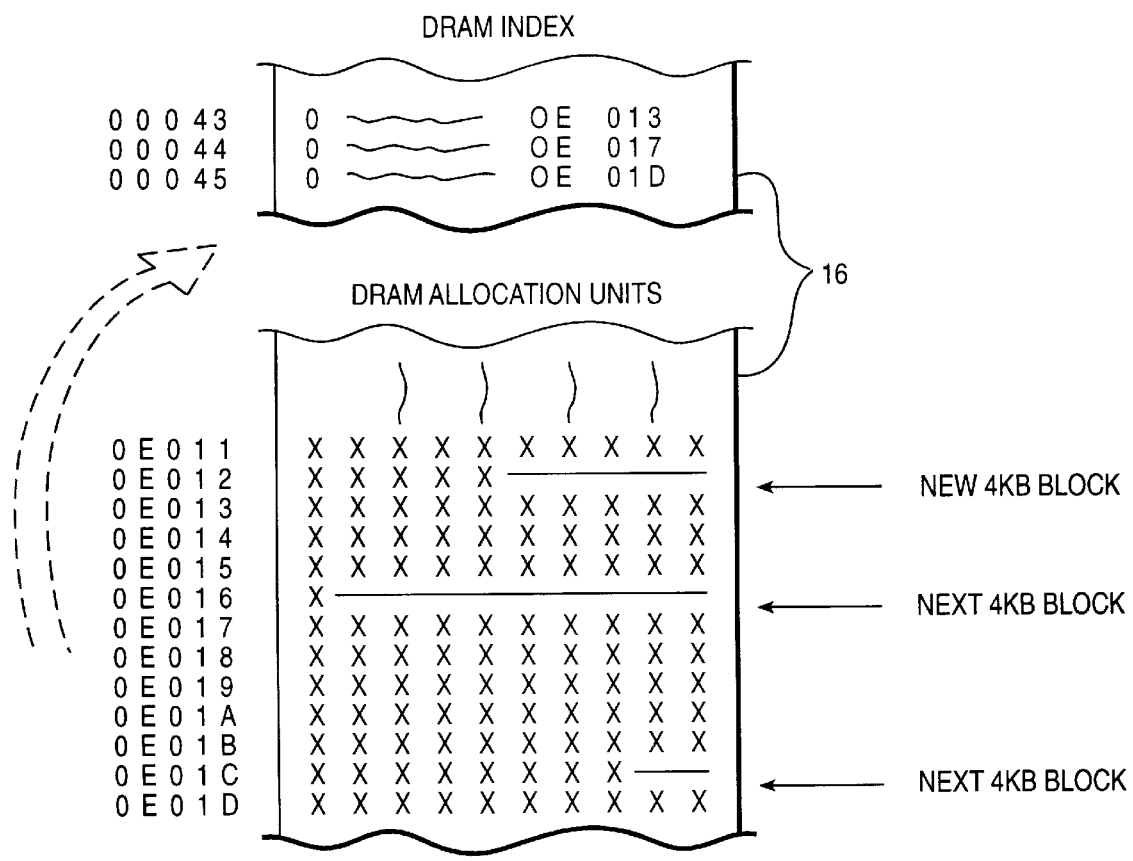
FIG. 6 schematically illustrates the structure of the cache DRAM as effected by 4K logical blocks.

Conceptually this is depicted in FIG. 6, where the index and allocation unit regions of DRAM 16 are shown to be related. Individually compressed 4K byte logical blocks of data are identified by a starting address in the index. Since the 4K byte logical block size is designated through the interaction of counter 18 and controller 19 (FIG. 3) as applied to uncompressed data, the compressed form of the data ends in random words and bit locations from block to block. For the example, in FIG. 6, a new 4K byte logical block is shown to start at allocation unit DRAM word address 0E013. That logical block ends at the first bit in allocation unit DRAM word address 0E016, with a remaining word bit positions being unused. The next 4K byte logical block begins with allocation unit word address 0E017 and ends with 0E01C. The sequence is repeated for successive 4K byte logical blocks within successively linked allocation units until the complete transfer unit is stored.

The selection of 4K bytes as a logical block size is a balance between the storage capacity lost when the trailing bits are discarded to align 4K byte logical blocks with word addresses in the DRAM, and the delay associated with decompressing a 4K byte logical block in response to an access by the processor. Therefore, both compression and decompression operations are performed on logical blocks of 4K bytes uncompressed data. It is estimated that the application of Lempel-Ziv compression to 4K byte size logical blocks versus complete transfer units of 64K to 200K bytes results in a compression loss of approximately 6%.

In exchange for the 6% decrease of compression, the speed of decompression is made materially faster using 4K byte logical blocks versus transfer units of 64K to 200K bytes. For example, in the embodiment of the present invention, where a typical disk drive utilizes 512 byte size sectors, it is possible that approximately 3,600 bytes of the 4K byte logical block will have to be decompressed and discarded to access a sector in the last 512 bytes. For a nominal decompression speed of 50 megabytes per second, this results in a maximum delay of approximately 72 microseconds. Since, on an average, only approximately 1,500 bytes will have to be decompressed and discarded before the selected sector of data first becomes available, the average delay is estimated to be approximately 31 microseconds.

Figure 7:
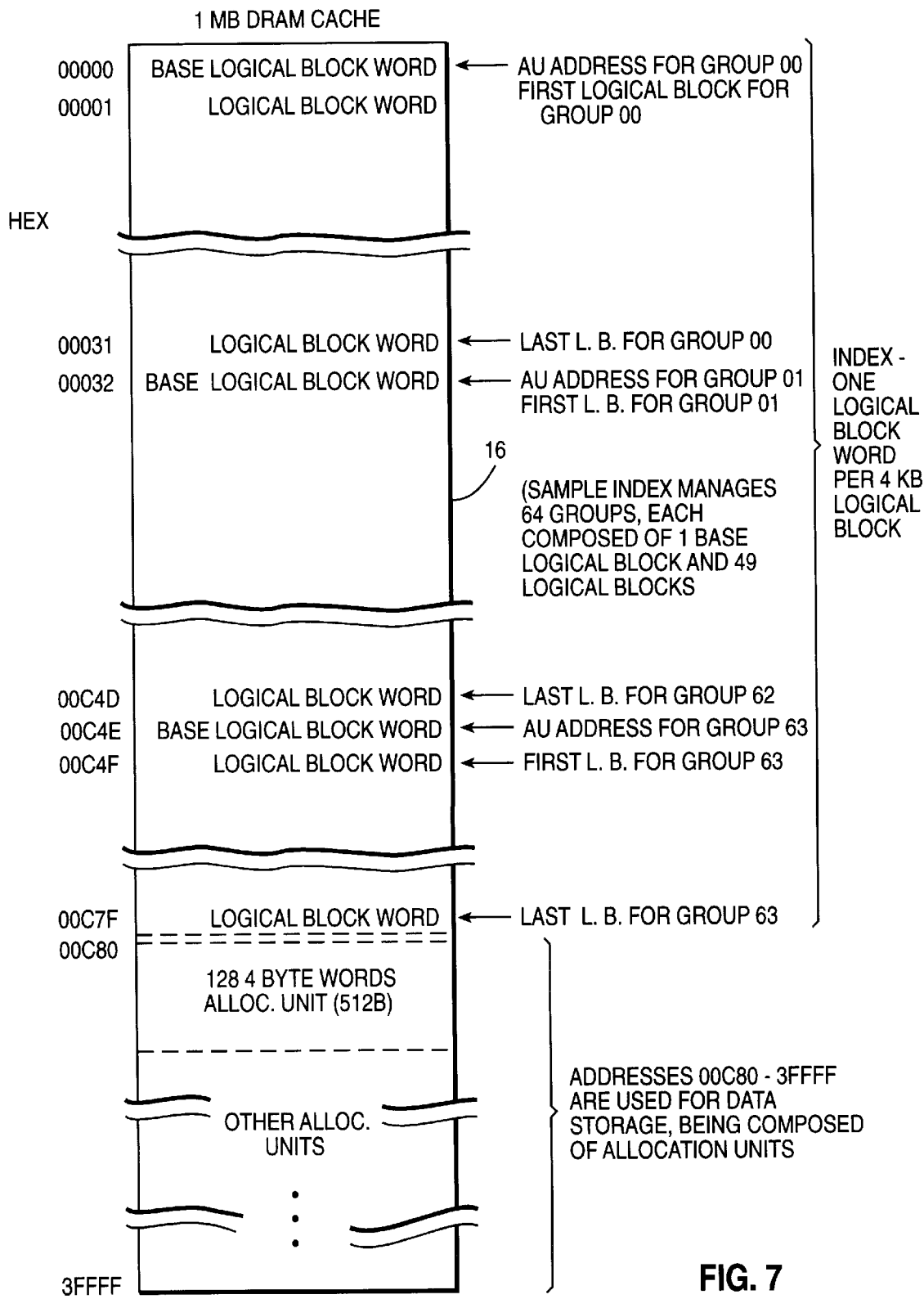
FIG. 7 schematically illustrates the index structure of the cache DRAM.

An indexing structure suitable to relate physical memory address space in DRAM 16 to the 4K byte logical blocks, within allocation units, is functionally depicted in FIG. 7. The preferred mechanism has controllers 21 and 23 (FIG. 3) assign, group, and access logical blocks assigned within the chains of randomly distributed allocation units. As shown in FIG. 7, the index occupies a contiguous area of DRAM beginning at address 00000and extending through address 00C7F with one DRAM word entry for each 4K byte logical block. The number of words specifying 4K byte logical block addresses within the index matches the number of the logical blocks to facilitate direct use by the controllers.

The word of data stored in the DRAM index for each 4K byte logical block consists of two fields. The first field identifies the address of the allocation unit. The second field identifies the word address within the DRAM allocation unit. With this information, DMA type cache read controller 23 (FIG. 3) directly accesses the 4K byte logical block by starting with the DRAM word identified in the index and incrementing in DMA fashion through successive word addresses within the DRAM until 4K bytes of data are derived in decompressed form.

FIG. 7 also illustrates that the index is divided into 64 groups, each group composed of 50 logical blocks, and each block itself including a single base logical block entry of information as the first word followed by 49 logical block entries of information for the remaining 49 words in each DRAM group. The base logical block word identifies through high and low order bit combinations the addresses of the first and last allocation units in the related data chain, with the data chain itself encompassing a transfer unit.

The number of entries in each group is determined by the maximum number of 4K byte logical blocks possible in the biggest transfer unit to be entered into the cache. The maximum number of groups is preferably derived by presuming the smallest transfer unit, and greatest compressibility, so as to derive the maximum number of transfer units which can be stored in the DRAM. For the embodying system, the index was configured with 64 groups, individually composed of 50 words individually representing 4K byte logical blocks of storable compressed data within each allocation unit address space of the DRAM.

Sample bit compositions for the base logical block word and the logical block word are schematically depicted in FIGS. 8 and 9, respectively. Since each word stored in DRAM 16 (FIG. 7), including the words stored in the index portion, is composed of 32 bits, spare bits are available in each word. The base logical block word as embodied is distinguished by the presence of a "1" in the first bit position, reserves bit position 01–03, uses bit positions 04–17 to identify the address of the first allocation unit in a data chain of a transfer unit, and uses the remaining bits 18–31 to identify the address of the last allocation unit in the data chain.

The bit structure of the logical block word is shown in FIG. 9. The logical block word is identified as such by the presence of a "0" in the 0 bit position, bit positions 01–03 are reserved, bit positions 07–17 specify the high order bits of the 4K byte logical block address, and as such identify an allocation unit within the data chain, and bits 25–31 specify the low order bits on the allocation unit, and as such the individual words representing the starting addresses of successive 4K byte logical blocks. Again, there are spare bits in each 32 bit DRAM word.

The assignment of the bits within the words of the index is determined by the system configuration. For the embodiment, using an SRAM of 2K bytes, 11 bits are assigned to the allocation units and accordingly used within the corresponding positions of the index logical block and base logical block words. Similarly, since the embodying DRAM is one megabyte, itself composed of 256K four-byte size words, each allocation unit has 128 words and correspondingly requires seven bits within the index word structure to be individually addressable.

The design and sizing of the index involves the specification of logical block groups, with each group being large enough to accommodate the largest contemplated transfer unit. Furthermore, there need to be enough logical block groups to manage the maximum number of transfer units storable in the cache at one time. These conflicting requirements do result in some waste of index storage space. For the embodiment, where the transfer units range in size from 64K to 200K bytes, and must accommodate a data compression ratio of 4:1, each of the 64 logical block groups in the index must have 50 logical block word entries. The word entry count is determined by dividing the largest transfer unit by the logical block size, while the number of groups is determined by dividing the DRAM cache size by the smallest compressed transfer unit size.

The embodiment utilizes 64 groups having 50 words, requiring an index of at least 3,200 words, which correspondingly consumes at least 1.2% of the DRAM address space. Since not all logical blocks in a logical block group may be required for a transfer unit, this leads to unused index address space. In addition, even when compression on an average is materially more than expected, the index structure will not allow additional transfer units of data to be placed into the DRAM cache. Additional storage in allocation units is precluded by virtue of the grouping limitation in the index structure. However, this loss is small when compared to the operational simplification achieved.

Controller 19 (FIG. 3) manages the operation of Lempel-Ziv data compressor 17 to receive uncompressed data from disk 1. Upon the receipt of 4K bytes of such data controller 19 terminates the operation of compressor 17 and flushes any residual therein. This process is repeated until a complete transfer unit is compressed and stored. Controller 19 communicates with controller 21 to identify the boundaries of individual 4K byte logical blocks of data.

Controller 21 manages the index and allocation operations within DRAM 16. At the start of each new logical block, as determined by controller 19, a logical block word (FIGS. 7 and 9) is entered into the index portion of DRAM 16. The logical block word so entered identifies the address of the allocation unit, as well as the word address within the allocation unit where the logical block is to be stored. Each 4K byte logical block starts on a new word in DRAM 16.

The base logical block word as stored in the index contains the address of the first allocation unit in a transfer unit and is later updated with the ending allocation unit for that transfer unit when the last logical block is compressed and stored.

As first noted with reference to FIG. 6, the compression of individual 4K byte size logical blocks for storage in DRAM 16, will vary and will accordingly affect the termination of each logical block. Therefore, on an average, half of a DRAM word, two bytes, will be wasted for each logical block compressed and stored in the DRAM. Based upon that valuation, and in the context of the embodied system having transfer units of 64K to 200K bytes and compression variations nominally extending from 2:1 to 4:1, 288 bytes will be lost on an average for each 64K byte transfer unit. If the data compression is nominally 4:1, this represents a 1.7% loss. For the larger transfer units and lesser compressibility effects, a nominal 0.35% storage space is lost. Therefore, the efficiency is acceptable for the data storage gain obtained through compression.

Taking into account the various efficiency implications, the embodying compressed data DRAM cache storage system utilizes approximately 97% of the storage capacity, losing the remaining 3% in the index structure plus overhead as a consequence of using 4K byte logical block boundaries. Given a nominal 2:1 data storage improvement with compression, the loss is relatively negligible in comparison to the benefit.

A conventional microcontroller (not shown) identifies which disk drive data, typically by track, is currently in cache and identifies the logical block groups associated with corresponding data sectors. This is merely a practice of conventional disk drive caching techniques. If a cache hit occurs, the address is translated into a logical block containing the corresponding sector of data, again in normal manner. Once the logical block is identified and access is sought, controller 23 (FIG. 3) initiates the readout and decompression by using the logical block word to find the address of the base logical block in the index of DRAM 16. The base logical block word contains the allocation unit address. With the allocation unit address as the high order bits and the allocation unit word address in the lower bits, the 4K byte logical block is specified. Thereafter, successive allocation unit words are accessed using a DMA sequence until the retrieval and decompression of the selected sector in the 4K byte logical block is detected by sector selector 26 (FIG. 3).

The creation of a free chain, and the scavenging of unused DRAM address space for inclusion in an existing free chain, are described next. As noted earlier, the starting location of the free chain is always stored at the 000 address of SRAM 22. If the data in the 000 address location is a "0", that indicates the absence of available free chain. Upon reaching the end of a transfer unit of data being stored into DRAM 16, controller 21 (FIG. 3) determines whether the data attributed to the present allocation unit as stored in SRAM 22 is zero in value. When the value is non-zero, residual allocation units are left over from the chain last being used to load a transfer unit. Note also that the chain being used to load the transfer unit could have itself been the free chain.

If residual allocation units are left from a free chain being used in the course of loading the transfer unit, then the 000 address of SRAM 22 is loaded with the next successive address in the chain to define the origin of the new free chain. On the other hand, if a previous data chain is being used, then the residual address space of the chain will need to be added to the pre-existing free chain. This is accomplished as illustrated in FIG. 10.

Figure 10:
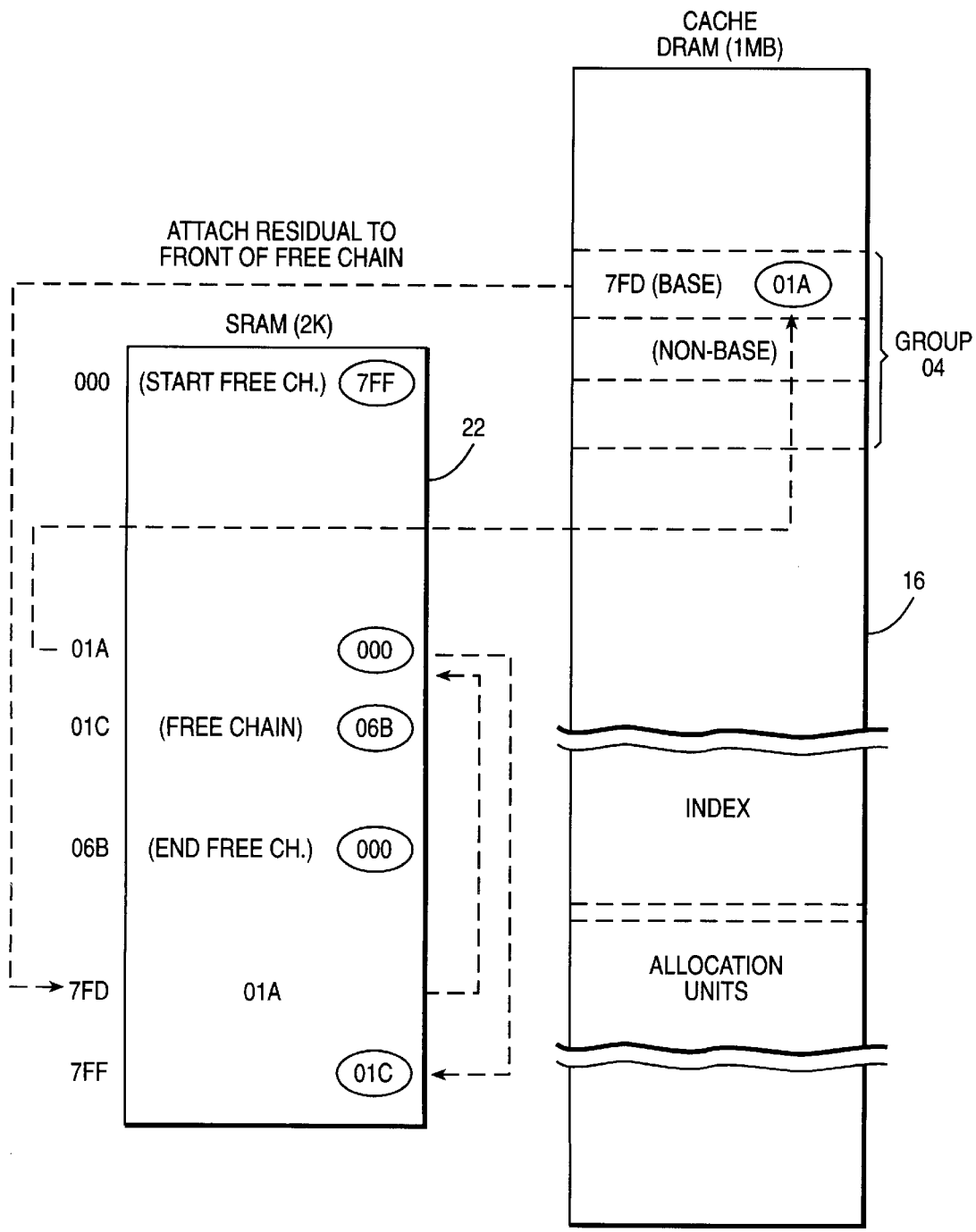
FIG. 10 schematically illustrates the scavenging of residual address space for inclusion in a free chain.

The illustration in FIG. 10 depicts the interaction between SRAM 22 and DRAM 16 in the course of attaching the residual of a data chain to the front of an existing free chain. The original free chain started with address 01C and concluded with address 06B. The segment of chain to be attached is determined to be in group 4, commencing with the allocation unit having high order address 7FD, then progressing to the allocation unit having address 01A, and concluding with the allocation unit having address 7FF. If in the course of loading the transfer unit the loading is completed with the use of allocation unit 01A, then allocation unit 7FF becomes residual and available for addition to any existing free chain.

As noted earlier, the residual allocation unit is added to the beginning of the free chain. Since the loading of the transfer unit finished with allocation 01A, the data for that address in SRAM 22 is replaced with 000 to indicate the end of a data chain. Thereupon, the 000 address of SRAM 22 is changed from the previous 01C value to the new address of 7FF. Lastly, the data in address location 7FF of SRAM 22 is changed from 000 to 01C. In this way the residual allocation unit 7FF is scavenged for use with the free chain, the free chain now being composed of the sequence of allocation units 7FF, 01C and 06B. Note also that the base logical block word in the index of DRAM 16 is changed from the previous 7FF to the new chain end of 01A.

It will be understood by those skilled in the art that the embodiments set forth hereinbefore are merely exemplary of the numerous arrangements by which the invention may be practiced, and as such may be replaced by equivalents without departing from the invention which will now be defined by appended claims.

We claim:

1. A data caching interface situated between a data storage system and a data processing system, comprising:

means for compressing a block of data received from the data storage system into a related compressed data unit;

cache memory means for storing multiple compressed data units as received from the means for compressing in addressable allocation units;

means for linking multiple allocation units storing data in the cache memory means into a chain corresponding to a transfer unit of multiple successive blocks of data;

index means for converting a data processing system address to a specific block of data into an address identifying a specific compressed data unit within a specific allocation unit stored in the cache memory means; and means for decompressing the specific compressed data unit as stored in the cache memory means into the specific block of data responsive to a request from the data processing system.

2. The apparatus recited in claim 1, further comprising:

means for identifying free allocation units in the cache memory means; and means for linking two or more identified free allocation units into a free chain.

3. The apparatus recited in claim 1, wherein the data storage system is a nonvolatile storage medium.

4. The apparatus recited in claim 2, wherein the data storage system is a nonvolatile storage medium.

5. The apparatus recited in claim 3, wherein the means for linking adds or deletes allocation units from a chain depending on the compressibility of the blocks of data in a transfer unit related to the chain.

6. The apparatus recited in claim 4, wherein the means for linking adds or deletes allocation units from a chain depending on the compressibility of the blocks of data in a transfer unit related to the chain.

7. The apparatus recited in claim 5, wherein the cache memory means is a volatile random access memory.

8. The apparatus recited in claim 6, wherein the cache memory means is a volatile random access memory.

9. The apparatus recited in claim 7, wherein the means for decompressing data decompresses compressed data materially faster than the means for compressing data compresses decompressed data.

10. The apparatus recited in claim 8, wherein the means for decompressing data decompresses compressed data materially faster than the means for compressing data compresses decompressed data.

11. A method of operating a data cache interface situated between a data storage system and a data processing system, comprising the steps of:

compressing a block of data received from the data storage system into a related compressed data unit;

storing multiple of the compressed data units in addressable allocation units of a cache memory so that multiple allocation units corresponding to a transfer unit of multiple blocks of the data received from the data storage system are linked in a common chain;

generating an index to convert a data processing system address to a specific block of data into an address which identifies a specific compressed data unit within a specific allocation unit stored in the cache memory; and decompressing the specific compressed data unit as stored in the cache memory into the specific block of data responsive to a request from the data processing system.

12. The method recited in claim 11, comprising the further steps of:

identifying free allocation units in the cache memory; and linking two or more identified free allocation units into a free chain.

13. The method recited in claim 11, wherein the data storage system is a nonvolatile storage medium.

14. The method recited in claim 12, wherein the data storage system is a nonvolatile storage medium.

15. The method recited in claim 13, wherein the multiple allocation units linked in a chain are increased or decreased depending on the compressibility of the blocks of data in a transfer unit related to the chain.

16. The method recited in claim 14, wherein the multiple allocation units linked in a chain are increased or decreased depending on the compressibility of the blocks of data in a transfer unit related to the chain.

17. The method recited in claim 15, wherein the storing is accomplished in a volatile random access memory.

18. The method recited in claim 16, wherein the storing is accomplished in a volatile random access memory.

19. The method recited in claim 17, wherein the decompression of compressed data is accomplished materially faster than the compression of decompressed data.

20. The method recited in claim 18, wherein the decompression of compressed data is accomplished materially faster than the compression of decompressed data.

* * * * *